United States Patent
Mann et al.

[11] Patent Number: 5,706,416
[45] Date of Patent: Jan. 6, 1998

[54] METHOD AND APPARATUS FOR RELATING AND COMBINING MULTIPLE IMAGES OF THE SAME SCENE OR OBJECT(S)

[75] Inventors: Steve Mann, Cambridge; Rosalind W. Picard, Wilmington, both of Mass.

[73] Assignee: Massachusetts Institute of Technology, Cambridge, Mass.

[21] Appl. No.: 558,012

[22] Filed: Nov. 13, 1995

[51] Int. Cl.$^6$ ............................................. G06F 15/00
[52] U.S. Cl. ........................................................ 395/127
[58] Field of Search ........................... 395/127, 121, 395/130, 135, 136, 133

[56] References Cited

U.S. PATENT DOCUMENTS

| | | | |
|---|---|---|---|
| 5,060,171 | 10/1991 | Steir et al. | 395/135 |
| 5,185,808 | 2/1993 | Cok | 395/135 X |
| 5,271,097 | 12/1993 | Barker et al. | 395/135 |
| 5,398,309 | 3/1995 | Atkins et al. | 395/133 |
| 5,594,850 | 1/1997 | Noyama et al. | 395/135 |

OTHER PUBLICATIONS

Tsai, Roger et al., "Estimating Three–Dimensional Motion Parameters of a Rigid Planar Patch", *IEEE Trans. Acoust., Speech, Signal Processing*, vol. ASSP–29, pp. 1147–1152, Dec. 1981.
Bergen, James R. et al., "Computing Two Motions from Three Frames", Apr. 1990, pp. 1–24.
Szeliski, Richard et al., "Spline–Based Image Registration", Apr. 1994, pp. 1–38.
Szeliski, Richard, "Image Mosaicing for Tele–Reality Applications", May 1994, pp. 1–30.
Sawhney, Harpreet S., "Simplifying Motion and Structure Analysis Using Planar Parallax and Image Warping" *IEEE* 1994, pp. 403–408.
Mann, Steve, "Compositing Multiple Pictures of the Same Scene", 1993–1994, pp. 1–4.
Teodosio, Laura et al., "Salient Video Stills: Content and Context Preserved" from Proceedings of the ACM Multimedia Conference, Anaheim, Aug. 1993.
Irani, Michal et al., "Image Sequence Enhancement Using Multiple Motions Analysis" *IEEE* 1992, pp. 216–221.
Barron, J.L., "Performance of Optical Flow Techniques", *IEEE* 1992, pp. 236–242.
Wang et al., "Spatio–Temporal Segmentation of Video Data," M.I.T. Technical Report No. 262 (Feb. 1994), pp. 1–12.

*Primary Examiner*—Phu K. Nguyen
*Assistant Examiner*—Cliff N. Vo
*Attorney, Agent, or Firm*—Cesari and McKenna, LLP

[57] ABSTRACT

Digitally encoded images having common subject matter are spatially related to one another and combined utilizing a projective coordinate transformation, the parameters of which are estimated featurelessly. For a given input image frame, the universe of possible changes in each image point consistent with the projective coordinate transformation is defined and used to find the projective-transformation parameters which, when applied to the input image, make it look most like a target image. The projective model correctly relates images of common (static) subject matter taken by a single camera at a fixed location, free to rotate about its center of projection (e.g., free to rotate about its optical axis, and to pan and tilt) and having a lens free to zoom; and planar scenes recorded by a camera free to move arbitrarily (including translation or other movements of the center of projection itself).

14 Claims, 2 Drawing Sheets

METHOD AND APPARATUS FOR RELATING AND COMBINING MULTIPLE IMAGES OF THE SAME SCENE OR OBJECT(S)

FIELD OF THE INVENTION

The present invention relates to processing of digitally encoded images, and in particular to methods and apparatus for comparing, aligning and assembling multiple such images that include overlapping subject matter.

BACKGROUND OF THE INVENTION

The ability to relate digitized images containing overlapping subject matter facilitates a wide variety of image-processing and enhancement operations. Multiple images can be "stitched together" into a composite image, effectively expanding the camera's visual frame. At the level of a single image, overlapping subject matter can be drawn from related images to enhance the image resolution of the overlapped portion or to stabilize video images.

A concomitant to combining overlapping image portions is the ability to discriminate between images that do, in fact, contain common visual subject matter and those that do not. For example, as an aid to motion-picture editors, video streams can be labeled with time stamps indicating "shot changes" between unrelated scenes. Database libraries of images can be canvassed for entries related (or equivalent) to a reference image by searching for common features (e.g., the same scene photographed from a different angle).

The analysis required to compare and combine related images is typically very complex, since merely in moving the camera to obtain different views the photographer inevitably encodes unique visual relationships in each image. Any one frame, for example, ordinarily reflects the effect of perspective recession, whereby lines converge toward a vanishing point and receding objects draw closer together (a phenomenon known as "chirping"). The effect of perspective changes with viewpoint, so overlapping image portions cannot simply be overlaid. Further complicating image combination is the "keystoning" effect produced by inclining the optical axis of the camera upward or downward relative to the recorded scene, which results in converging lines.

The difficulty increases when the images are taken by different cameras, or by a single camera that may undergo physical movement and/or changes in focal length. To combine such images, their contents must first be related to one another in a geometrically consistent fashion, free of the distracting pictorial idiosyncracies that stem from the characteristics and movement of the camera(s); in other words, the images must be put into the same coordinate frame. The operations necessary to place two images in the same coordinate frame, so that common feature points from one image can be related to those of another, represent a coordinate transformation. This transformation counteracts the effects of camera and motion; indeed, if the transform operations are known explicitly, they can be used to reconstruct or recover camera parameters and motion.

To combine images (or to reconstruct the camera motions that produced successive images), it is important to have both a precise description of the coordinate transformation between any given pair of images or video frames, and some indication as to how accurately this coordinate transformation accounts for the differences in the two images. To this end, a variety of approximate but mathematically tractable transformations have been employed. The most common assumption (especially in motion estimation for coding, and optical flow for computer vision) is that successive frames are related to one another by simple translation. See, e.g., Tekalp et al., *Proc. of the Int. Conf. on Acoust., Speech and Sig. Proc.*, pp. 111–169 (1992). Although translation imposes few constraints and is simple to implement, it is poor at handling large changes due to camera zoom, rotation, pan and tilt.

Affine transformations exactly describe rotation about the optical axis of the camera, camera zoom and pure shear (a theoretical artifact that real-world cameras cannot cause). However, the affine model cannot capture camera pan and tilt, and therefore cannot accurately express chirping or keystoning. Consequently, the affine model uses the wrong parameters to describe these visual effects, resulting in imperfectly aligned images.

Other approximate transformational models include the 12-parameter biquadratic model and the 8-parameter bilinear model. The latter is widely used in the fields of image processing, medical imaging, remote sensing and computer graphics, but fails to capture chriping.

The eight-parameter projective model precisely accounts for camera translation, pan, tilt, rotation about the optical axis and zoom, as well as for chirping and keystoning; the eight parameters encode movement along all three spatial axes, zoom (i.e., scale in each of the image coordinates x and y), and rotation (including rotations due to panning, tilting, and movement about the optical axis). The projective parameters can exactly relate to a reference image any other image resulting from application of one or more of the allowed parameters to the reference image; the set of all possible images that can be produced by variation of these parameters is herein referred to as a "video orbit." That is, the video orbit of a given image connotes the set of all images that can be produced by applying operators from the projective group to the given image.

Unfortunately, the projective parameters are notoriously difficult to estimate. One approach relies on manual identification of corresponding features in two images sought to be related; the point correspondences are then used to estimate projective parameters. See, e.g., Tsai et al., *tassp*, vol. ASSP-29, pp. 1147–52 (December 1981); Faugeras et al., *Int'l. of Patt. Recog. and Artif. Intell.*, vol. 2, no. 3, pp. 485–508 (1988); Shashua et al., "Relative Affine: Theory and Application to 3D Reconstruction From Perspective Views," *Proc. IEEE Conf. on Comp. Vision and Patt. Recog.* (1994); Sawhney, "Simplifying motion and structure analysis using planar parallax and image warping," *CVPR* (1994); Kumar et al., "Shape recovery from multiple views: a parallax based approach," *ARPA Image Understanding Workshop* (November 1984). The feature-based approach is not only cumbersome in requiring hand-selection of reliable features, but is also prone to inaccuracy due to signal noise and occlusion (as well as poor feature choices).

Featureless approaches, however, have not heretofore been available for projective coordinate transformations. For example,generalized cross-correlation is "featureless" in the sense that operations are performed on the entire image instead of explicitly defined features therein, but has been applied only to simple translation. Moreover, its approach involves an exhaustive search for the mathematical operator that "best" relates the two frames in accordance with the desired form of transformation. See, e.g., H. L. Van Trees, *Detection, Estimation, and Modulation Theory (Part I)* (1968); R. Young, *Wavelet Theory and its Applications* (1993). The technique is computationally prohibitive for all but coarse sampling frequencies, resulting in the need for iterative gradient-based search procedures that are cumbersome and prone to becoming trapped in local optima, producing incorrect results.

DESCRIPTION OF THE INVENTION

Brief Summary of the Invention

The present invention provides a featureless approach to relating images to one another using a projective coordinate transformation. The invention utilizes spatiotemporal derivatives of a pixel parameter (such as brightness, luminance or color) to obtain an "optical flow" or "optical fit" model of transformation. For a given input image frame, the model defines the universe of possible changes in each image point consistent with the projective coordinate transformation, and is used to find the projective-transformation parameters which, when applied to the input image, make it look most like a target image. The projective model used in the invention correctly relates images of common (static) subject matter taken by a single camera at a fixed location, free to rotate about its center of projection (e.g., free to rotate about its optical axis, and to pan and tilt) and having a lens free to zoom; and planar scenes recorded by a camera free to move arbitrarily (including translation or other movements of the center of projection itself).

Optical fit assumes that each point in a first image or image region can be related to a corresponding point in a second image according to a transformation model. With this approach, the pixels of both images are compared to identify point correspondences, and the degree and direction of displacement between corresponding points (the "flow velocity") is determined. Parameters of the chosen transformation model that "explain" each displacement are then computed. Although these parameters would ideally be consistent across the "flow field" of point correspondences and velocities, in practice they vary due to shifts not explainable by the transformation model or to errors in calculation; accordingly, linear regression is used to find the transformation parameters which, while not perfectly accounting for each displacement, best transform the first image into the second image. Optical fit is widely used in image analysis—specialized hardware is even available to generate the flow field—but is ordinarily employed based on a simple translation model. The present invention extends this technique to facilitate featureless recovery of projective coordinate transformation parameters.

The "optical flow" procedure does not require point-to-point correspondences. Instead, the change in a pixel parameter (e.g., brightness) from one image to another is assessed at each pixel position, and the global set of changes used to compute a best-fit transformation that accounts for these changes. The present invention extends this technique also to estimation of projective coordinate transformation parameters. The optical flow model is validly used to relate one image to another when the change between them is relatively small. Accordingly, the invention is preferably applied to closely related images in a sequence. Because of the group structure of such a sequence, the coordinate transformations between, for example, successive frames can be accumulated using the law of composition afforded by the group, and used to relate any one frame in the sequence to any other frame.

The analytic techniques of the present invention are applicable over a wide range of resolutions. However, it is preferred to analyze images iteratively, at multiple resolution levels. Beginning with coarsely sampled images, the invention is first used to determine whether the two images even lie in the same orbit. If so, further iterations at progressively finer resolutions approximate the projective (or "homographic") coordinate transformation relating the two images with increasing accuracy. Iterative processing is preferably also used at each level of resolution in the estimation procedure itself.

Accordingly, in a first aspect, the invention comprises methods and apparatus for determining whether two images are even related to one another according to a projective coordinate transformation. This application of the invention is useful, for example, in automatically detecting shot changes in a sequence of video frames.

In a second aspect, the invention is used to identify the common portions of two images, spatially align the images in a consistent coordinate reference frame, and combine the common image portions to enhance overall resolution. In a related third aspect, the invention is used to identify distinct, possibly non-overlapping image portions and "paste" these together, along with the common image portions, to produce a composite scene of greater spatial extent than any of the component images.

In a fourth aspect, the projective transformation estimated by the invention is analyzed to estimate the underlying camera parameters (i.e., tilt, pitch, roll and zoom setting.

In a fifth aspect, the invention is used to characterize the orbit of a plurality of related images. Once characterized, this orbit can be used to construct new images consistent with the orbit of the analyzed images yet never actually recorded by a camera.

In a sixth aspect, the invention provides a visual thesaurus of digitized images that can be searched for variations of a reference image. In particular, the invention searches for images projectively related to the reference image, and therefore containing common subject matter.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Image Analysis

Figure 1:
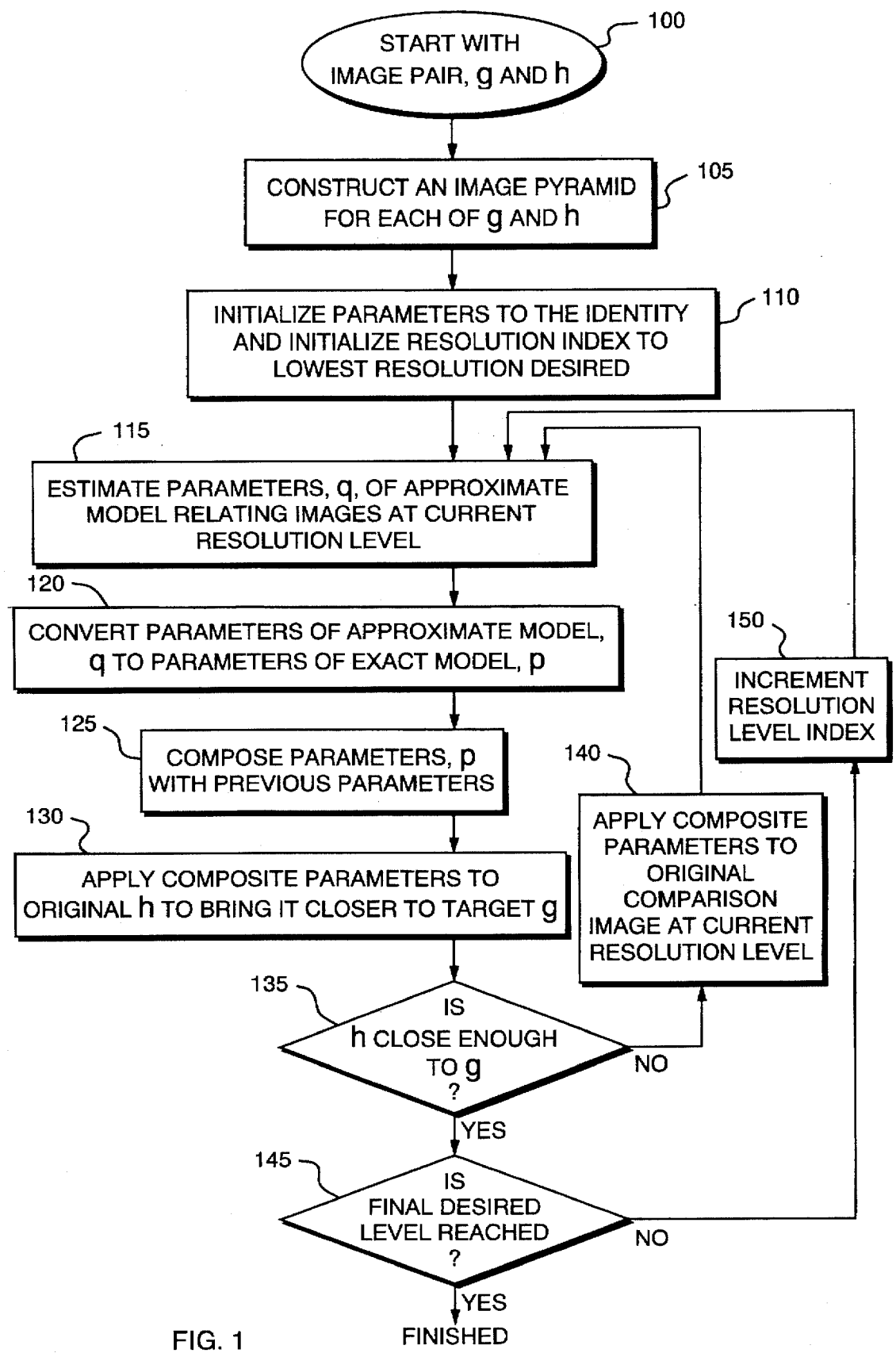
FIG. 1 is a flow chart illustrating iterative analysis of a pair of images at varying image resolutions, where the reference image is repeatedly processed to reduce error.

For simplicity of presentation, transformations in one dimension are described first; typically, of course, the invention is applied to two-dimensional images. In general, the optical flow parameter $u_f$ relates each point in a first image to a corresponding point in a second image in accordance with a transformation model. (As noted previously, the traditional optical flow formulation assumes that each point x in frame t is a translated version of the corresponding point in frame t+$\Delta$t, and that $\Delta$x and $\Delta$t are chosen in the ratio $\Delta x/\Delta t = u_f$—the translational flow velocity of the point in question.) The quantity $u_f$ can be related to the spatial and temporal derivatives of a pixel parameter such as brightness, luminance or color by the equation $$u_f E_x + E_t = 0 \quad \text{(Equation 1)}$$

where $E_x$ and $E_t$ are the spatial and temporal derivatives, respectively, of the pixel parameter E.

To find the proper flow parameters relating two images to one another, one can use the "optical fit" procedure to quantify the optical flow between each point in an input image and a corresponding point in a target image according to Equation 1, and find the optical-flow parameters that best fit the model to the observed optical flow; or, alternatively, use the "optical flow" procedure that utilizes the flow equation directly. In the projective case, optical fit and optical flow differ only in the weighting assumed, although "projective fit" provides the added advantage of enabling the motion within an arbitrary subregion of the image to be easily found. For global image motion, however, "projective flow" provides best results.

Suppose that (one-dimensional) coordinates in the input or reference image g are denoted by x, and that coordinates in the target image h are denoted by x'. The actual flow velocity is given by Equation 1, but the velocity predicted by the projective model is $$u_m = x' - x = \frac{ax+b}{cx+1} - x \qquad \text{(Equation 2)}$$

A discrepancy between the flow velocity $u_f$ and the model velocity $u_m$ is expected, due either to errors in the flow calculation or to errors in the ability of the model to relate the two images exactly. Regression can be applied to obtain the best least-squares fit by minimizing $$\epsilon_{fit} = \sum_x (u_m - u_f)^2 = \Sigma(u_m + E_t/E_x)^2 \qquad \text{(Equation 3)}$$

Alternatively, the projective coordinate transformation can be directly incorporated into the optical flow equation and the squared error $$\epsilon_{flow} = \sum_x (u_m E_x + E_t)^2 = \sum_x \left( \frac{ax+b}{cx+1} - x + \frac{E_t}{E_x} \right)^2 \qquad \text{(Equation 4)}$$

summed over the whole image; differentiating and equating the result to zero provides solutions for the projective parameters a, b and c. Using the first three terms of the Taylor series of $u_m$ $$u_m + x = b + (a-bc)x + (bc-a)cx^2 + (a-bc)c^2x^3$$

Equation 4 can be rewritten as $$\epsilon_{flow} = \Sigma((b+(a-bc-1)x+(bc-a)cx^2)E_x + E_t)^2 \qquad \text{(Equation 5)}$$

Defining $q_2=(bc-a)c$, $q_1=a-bc-1$, and $q_0=b$, and differentiating with respect to each of the three parameters of q, setting the derivatives equal to zero, and verifying with the second derivatives, gives the linear system of equations for "projective flow":

$$\begin{bmatrix} \Sigma x^4 E_x^2 & \Sigma x^3 E_x^2 & \Sigma x^2 E_x^2 \\ \Sigma x^3 E_x^2 & \Sigma x^2 E_x^2 & \Sigma x E_x^2 \\ \Sigma x^2 E_x^2 & \Sigma x E_x^2 & \Sigma E_x^2 \end{bmatrix} \begin{bmatrix} q_2 \\ q_1 \\ q_0 \end{bmatrix} = - \begin{bmatrix} \Sigma x^2 E_x E_t \\ \Sigma x E_x E_t \\ \Sigma E_x E_t \end{bmatrix} \qquad \text{(Equation 6)}$$

Analogously, the first three terms of the Taylor series of $u_m$ can be applied to Equation 3 to obtain $$\epsilon_{fit} = \Sigma(b+(a-bc-1)x+(bc-a)cx^2 + E_t/E_x)^2 \qquad \text{(Equation 7)}$$

and once again differentiating and setting to zero gives the linear system of equations for "projective fit":

$$\begin{bmatrix} \Sigma x^4 E_x & \Sigma x^3 E_x & \Sigma x^2 E_x \\ \Sigma x^3 E_x & \Sigma x^2 E_x & \Sigma x E_x \\ \Sigma x^2 E_x & \Sigma x E_x & \Sigma E_x \end{bmatrix} \begin{bmatrix} q_2 \\ q_1 \\ q_0 \end{bmatrix} = - \begin{bmatrix} \Sigma x^2 E_t/E_x \\ \Sigma x E_t/E_x \\ \Sigma E_t/E_x \end{bmatrix} \qquad \text{(Equation 8)}$$

Equation 1 can be extended into two dimensions as follows:

$$u_f E_x + v_f E_y + E_t = 0 \qquad \text{(Equation 9)}$$

where $u_f$ and $v_f$ are the flow velocity components in the x and y directions, respectively, and $E_x$ and $E_y$ are the x- and y-direction spatial derivatives of the pixel parameter E.

The eight parameters of a two-dimensional projective coordinate transformation are given by $$x' = \begin{bmatrix} x' \\ y' \end{bmatrix} = \frac{A[x,y]^T + b}{c^T[x,y]^T + 1} = \frac{Ax+b}{c^T x + 1} \qquad \text{(Equation 10)}$$

and the desired eight scalar parameters are denoted by p=[A, b; c, 1], where A is a 2×2 matrix of real numbers, and b and c are 2×1 matrices of real numbers.

Equation 10 can be expanded into Taylor series as follows:

$$u_m + x = q_{x'xy} xy + q_{x'x} x + q_{x'y} y + q_{x'}$$

$$v_m + y = q_{y'xy} xy + q_{y'x} x + q_{y'y} y + q_{y'} \qquad \text{(Equation 11)}$$

Incorporating these into Equation 4 yields a set of eight linear equations in eight unknowns for "bilinear flow":

$$\begin{bmatrix} \Sigma x^2 y^2 E_x^2, & \Sigma x^2 y E_x^2, & \Sigma xy^2 E_x^2, & \Sigma xy E_x^2, & \Sigma x^2 y^2 E_x E_y, & \Sigma x^2 y E_x E_y, & \Sigma xy^2 E_x E_y, & \Sigma E_x xy E_x \\ \Sigma x^2 y E_x^2, & \Sigma x^2 E_x^2, & \Sigma xy E_x^2, & \Sigma x E_x^2, & \Sigma x^2 y E_x E_y, & \Sigma x^2 E_x E_y, & \Sigma xy E_x E_y, & \Sigma E_x x E_x \\ \Sigma xy^2 E_x^2, & \Sigma xy E_x^2, & \Sigma y^2 E_x^2, & \Sigma y E_x^2, & \Sigma xy^2 E_x E_y, & \Sigma xy E_x E_y, & \Sigma y^2 E_x E_y, & \Sigma E_y y E_x \\ \Sigma xy E_x^2, & \Sigma x E_x^2, & \Sigma y E_x^2, & \Sigma E_x^2, & \Sigma xy E_x E_y, & \Sigma x E_x E_y, & \Sigma y E_x E_y, & \Sigma E_x E_x \\ \Sigma x^2 y^2 E_x E_y, & \Sigma x^2 y E_x E_y, & \Sigma xy^2 E_x E_y, & \Sigma E_x xy E_y, & \Sigma x^2 y^2 E_y^2, & \Sigma x^2 y E_y^2, & \Sigma xy^2 E_y^2, & \Sigma xy E_y^2 \\ \Sigma x^2 y E_x E_y, & \Sigma x^2 E_x E_y, & \Sigma xy E_x E_y, & \Sigma E_x x E_y, & \Sigma x^2 y E_y^2, & \Sigma x^2 E_y^2, & \Sigma xy E_y^2, & \Sigma x E_y^2 \\ \Sigma xy^2 E_x E_y, & \Sigma xy E_x E_y, & \Sigma y^2 E_x E_y, & \Sigma E_x y E_y, & \Sigma xy^2 E_y^2, & \Sigma xy E_y^2, & \Sigma y^2 E_y^2, & \Sigma y E_y^2 \\ \Sigma xy E_x E_y, & \Sigma x E_x E_y, & \Sigma y E_x E_y, & \Sigma E_x E_y, & \Sigma xy E_y^2, & \Sigma x E_y^2, & \Sigma y E_y^2, & \Sigma E_y^2 \end{bmatrix} \begin{bmatrix} q_{x'xy} \\ q_{x'x} \\ q_{x'y} \\ q_{x'} \\ q_{y'xy} \\ q_{y'x} \\ q_{y'y} \\ q_{y'} \end{bmatrix} =$$

$$- [\Sigma E_t xy E_x, \Sigma E_t x E_x, \Sigma E_t y E_x, \Sigma E_t E_x, \Sigma E_t xy E_y, \Sigma E_t x E_y, \Sigma E_t y E_y, \Sigma E_t E_y]^T \qquad \text{(Equation 12)}$$

The summations are over the entire image (all x and y) if computing global motion, or over a contiguous area (a "windowed patch" or "bounding box") of the image if computing local motion.

This procedure produces a set of "model" parameters based on the approximation of Equation 5. The quality of the estimated parameters is then assessed by utilizing these in the exact projective transformation (Equation 10), applying the transformation to the reference image, and assessing the resulting image against the target image (i.e., approximate feedforward and exact feedback). In one dimension, it is possible simply to solve three linear equations in three unknowns to estimate the parameters of the approximate motion model, and then relate the terms in this Taylor series to the exact parameters a, b, c by solving another set of three equations in three unknowns. In two dimensions, although the estimation step can be carried out as set forth above, relating the estimation to the exact parameters is more difficult; the parameters derived using the Taylor series do not correspond directly to the parameters of Equation 10; in fact, the equations relating the terms in the Taylor series of the approximate model to the desired exact model parameters comprise eight nonlinear equations in eight unknowns. Instead of solving these equations directly, the approximate model is preferably related to the exact model using the following procedure:

1. In the source image, select four ordered pairs of points (i.e., pixels specified by coordinate location), such as the four corners of the bounding box containing the region under analysis, or the four corners of the image if the entire image is under analysis. Suppose, for simplicity, that these points are the corners of the unit square $s=[s_1, s_2, s_3, s_4]=[(0,0)^T,(0,1)^T,(1,0)^T,(1,1)^T]$.

2. Apply the approximate coordinate transformation obtained with Equation 12 or Equation 13 to each of the four points in the square s to obtain a set of four corresponding points r in the target image.

3. Assume that s maps exactly to r according to Equation 10. This results in four readily solved linear equations:

$$\begin{bmatrix} x'_k \\ y'_k \end{bmatrix} = \begin{bmatrix} x_k,y_k,1,0,0,0,-x_kx'_k,-y_kx'_k \\ 0,0,0,x_k,y_k,1,-x_ky'_k,-y_ky'_k \end{bmatrix} [a_{x'x},a_{x'y},b_{x'},a_{y'x},a_{y'y},b_{y'},c_x,c_y]^T$$ (Equation 13)

where $1 \leq k \leq 4$. This results in approximation of the exact eight parameters p based on the approximate model, with a goodness-of-fit estimate provided by summation of the mean-squared error in the pixel parameter E over corresponding regions in the target image and the projectively transformed reference image.

For projective fit, each pair of corresponding points $$\begin{bmatrix} x_k \\ y_k \end{bmatrix}, \begin{bmatrix} x'_k \\ y'_k \end{bmatrix}$$

are assumed to be related by a projective coordinate transformation. Equation 13 is therefore applied over the entire optical flow field to obtain the projective parameters relating each pair of corresponding points. Because the actual displacement between points represents a flow velocity, the linear regression formula of Equation 3 can be used to find the projective parameters ($u_m$) that capture, with least overall error, the system of flow velocities represented by the optical flow field.

It should be stressed that the approximations afforded by projective flow and projective fit suffice in accuracy for small deviations from the identity A=I, b=0, c=0, where I is the identity matrix $$\begin{bmatrix} 1 & 0 \\ 0 & 1 \end{bmatrix}.$$

It is not, however, adequate to describe large changes in perspective, Accordingly, the approximate model is preferably applied to a sequence of images, such as a sequence of video frames representing a single scene shot, that are largely similar to one another. By using the approximate model to track small frame-to-frame changes, and each time relating these small changes to the exact model using the above procedure, the small changes can be accumulated according to the law of composition afforded by the group structure. In particular, the law of composition means that if a transformation t relates a first image to a second image, and a transformation t' relates the second image to a third image, then the first and third images are related by a composite function t"=t o t'.

This procedure affords the ability to accurately relate images representing large changes in perspective (e.g., frames from different ends of a scene shot); instead of attempting to relate such disparate images directly, which would result in a relatively poor fit due to the limitations of approximation, they are instead related through a succession of more closely related intervening frames—that is, through cumulative application of the transformation functions that relate the intervening frames.

2. Iterative Processing

Although the foregoing analysis can be applied to a pair of frames of arbitrary resolution(s), it is preferably applied iteratively at multiple resolution levels. By beginning with the lowest resolution, this approach allows for quick determination whether two images even lie in the same orbit—that is, whether they represent variations resulting from application of one or more degrees of camera freedom captured by the projective model. If they do not, processing ceases, and this information can prove valuable in itself: for example, the first unrelated image detected in a sequence of video frames may represent a scene change, which can be tagged for subsequent editing purposes.

Refer to FIG. 1, which illustrates this procedure in flow-chart form. The process operates on a reference image g and a target image h, as shown at 100. In a first step 105, a Gaussian pyramid of multiple (generally three or four) resolution levels is constructed for the images g and h. This is accomplished, for example, by sampling the reference and target images at different rates. In the second step 110, the transformation parameters are initialized to identity and an index specifying the current image resolution is set to the bottom of the resolution pyramid, so that processing begins on the lowest-resolution pair of images g, h.

Using the estimation and relating techniques discussed above, the projective transformation parameters p relating g to h are obtained in step 115. At each level of resolution the parameters p are estimated iteratively, and the law of composition used to facilitate incremental convergence to a solution. Indeed, iterative estimation of the parameters p represents a useful strategy whether or not images are compared at varying resolution levels.

Thus, instead of using the projectively transformed reference image (that is, the image produced by projectively transforming the reference image based on the estimated parameters) merely to assess goodness of fit, the projectively transformed reference image is itself used as a reference image to re-estimate the projective parameters; and once again, the image produced by projectively transforming this new reference image is assessed against the target image to quantify the error. This procedure is repeated until the error between reference and target images falls below some predetermined threshold determined by computational resources and allowable processing time or until an arbitrary maximum number of iterations (two or three are generally sufficient for images in or near the same orbit) has been performed. Using the law of composition, the transformation parameters obtained at each iteration are cumulated into a composite function relating the original reference image to the target image.

This procedure is set forth at steps 115–125. In step 115, $g_0$ is defined as the original reference image g, and the terms of the approximate projective model relating image frames $g_0$ and h are derived as previously described. The parameters derived through approximation are used to establish a projective coordinate transformation function $t_0$, preferably using the four-point approach as described above. The transformation to is applied to the reference frame $g_0$ to produce a processed reference image $g_1$.

In steps 120–130, this processed reference image is compared with the target image h, and a new set of projective parameters relating the processed reference image $g_1$ to the target image h is derived. These parameters are used to establish a new projective coordinate transformation function $t_1$. The composite function $t_0 \circ t_1$ is applied to the reference image $g_0$ at step 125, and the resulting image $g_2$ compared to h at step 135. If the image $g_2$ is insufficiently close to h (as determined visually or computationally, e.g., by the magnitude of the mean squared error), steps 115–130 are repeated; a transformation $t_2$ is established from the image $g_2$ to the reference image h and the composite function $t_0 \circ t_1 \circ t_2$ is applied to $g_0$ (step 140). The process continues until the visual comparison is acceptable, or a maximum acceptable error is no longer exceeded, or for an arbitrary number of iterations. The final composite function has the form $$t = t_0 \circ t_1 \circ \ldots \circ t_n$$

It should be noted that a rectangular image assumes the shape of an arbitrary quadrilateral when it undergoes a projective coordinate transformation. One useful implementational strategy, therefore, is to surround the transformed image with a rectangular bounding box and pad undefined portions (i.e., "empty" portions outside the quadrilateral) with the quantity NaN, a standard IEEE arithmetic value, so that any calculations involving these values automatically inherit NaN without slowing down the computation The iterative process embodied in steps 115–140 is repeated for each resolution level. As shown at steps 145 and 150, the resolution index is incremented and steps 115–140 repeated on the next-higher resolutions of g and h until the highest-resolution images in the pyramid are reached, and the parameters relating these images are the final parameters.

The foregoing procedures can be enhanced various ways. The Taylor-series formulations employed in our optical-flow approximation implicitly assume smoothness. Typical images, however, have many sharp edges and contours that violate this assumption. Accordingly, performance of the multiple-resolution frame comparison is improved if the images are blurred with a suitable bandlimiting function before estimation. Of course, since what is ultimately desired is a sharp image the original (unblurred) images are used when applying the final coordinate transformation.

Parameter estimation performance can be improved by first estimating the parameters that commute, since estimating the parameters of a commutative group of coordinate transformations is computationally efficient through the use, for example, of Fourier cross-spectra; see Girod et al., "Direct Estimation of Displacement Histograms," *OSA Meeting on Image Understanding and Machine Vision*, June 1989. Thus, better performance is obtained if one first estimates the two parameters of translation, then uses these parameters to correct the reference image for the translation, and then proceeds to estimate the eight projective parameters.

Similarly, if the reference image is merely a rotated version of the target image, one can apply a log-polar coordinate transformation to both target and reference images so that they become related by a translation in the plane. Thus, it is possible to simultaneously estimate isotropic-zoom and rotation about the optical axis by applying a log-polar coordinate transformation followed by a translation estimator; alternatively, the same result can be achieved by application of the Fourier-Mellin transform (see Sheng et al., "Frequency-Domain Fourier-Mellin Descriptors for Invariant Pattern Recognition," *Optical Engineering*, May 1988). If the only difference between reference and target images is a camera pan, then the pan can be estimate through a coordinate transformation to cylindrical coordinates, followed by a translation estimator.

In practice, we have found that it is computationally beneficial to execute the following "commutative initialization" before estimate projective parameters:

1. Assume that the target image is merely a translated version of the reference image.
   a. Estimate this translation using Fourier cross-spectra;
   b. Shift the reference image by the amount indicated by the estimated translation;
   c. Compare the mean squared error between the shifted reference and target images to the mean squared error between the unshifted reference and target images; and
   d. If an improvement has resulted, use the shifted reference image for subsequent computations.
2. Assume that the target image is merely a rotated and isotropically zoomed version of the reference image.
   a. Estimate the two parameters of this coordinate transformation;
   b. Apply these parameters to the reference image;
   c. If an improvement in mean square error results, use the coordinate-transformed (rotated and scaled) reference image for subsequent computations.
3. Assume that the reference image is merely an "x-chirped" (panned) version of the target image.
   a. Estimate the amount of x-chirp through a coordinate transformation to cylindrical coordinates followed by translation estimation;
   b. Apply the inverse of this coordinate transformation to the reference image to "x-dechirp" the image; and
   c. If an improvement in mean square error results, use the "x-dechirped" reference image for subsequent computations.
4. Assume that the reference image is merely a "y-chirped" (tilted) version of the target image.
   a. Estimate the amount of y-chirp through a coordinate transformation to cylindrical coordinates followed by translation estimation;
   b. Apply the inverse of this coordinate transformation to the reference image to "y-dechirp" the image; and
   c. If an improvement in mean square error results, use the "y-dechirped" reference image for subsequent computations.

Although it might seem desirable to execute the foregoing commutative estimates iteratively for successive projective transformations, our experience indicates that a single pass usually suffices. This pre-processing procedure identifies the frequent situations where two images are related by a pure zoom, a pure pan or tilt, etc., thereby saving considerable computational effort while providing an exact transformation.

3. Applications a. Image Alignment

Assume that recovery of projective-transformation parameters between two images is successfully accomplished (that is, the mean squared error is within acceptable limits). Unless the two images are merely translated versions of one another, they cannot be combined additively. Instead, the one of the images is transformed according to the projective parameters so that it is spatially consistent with the other image. Only then may the common portions be directly overlapped without distortion. This process of correcting for spatial inconsistency (due to variation in any of the parameters captured by projective transformation) and registering the common portions is herein referred to as "alignment."

As described below, aligned images may be stitched together in a panorama of increased dimension, and overlapping portions combined by averaging or otherwise processed to increase resolution.

b. Resolution Enhancement

If resolution were perfect—that is, if every image contained an infinite amount of information so that the depicted scene were accurate in the minutest detail—the common portions of overlapping images would be absolutely redundant. In the real world, however, given the imperfections of lenses, the distortive effects of camera movement and the limited number of pixels in the recording sensor array, overlapping images portions are likely to contain non-redundant information which, when combined, produces a finer level of fidelity than either image alone. This is particularly true, for example, in the case of a normal or wide-angle shot and a zoom close-up of a portion of that shot. Merely by combining overlapping images, it is possible to obtain enhanced detail of the overlapping portions. The more images that are combined, the greater will be the overall degree of enhancement.

Once again, because of the group structure of the projective coordinate transformations, any image in a sequence can be related to any other image of the sequence either by arbitrarily selecting one frame and finding the coordinate transformation between this frame and every other frame, or by finding the coordinate transformations between successive frames.

More specifically, "cumulative parameter estimation" involves obtaining coordinate transformations between a reference image and every other image of the sequence: $t_{0 \to 1}, t_{0 \to 2}, \ldots, t_{0 \to n}$. "Differential parameter estimation," on the other hand, involves obtaining coordinate transformations between successive pairs of images in the sequence: $t_{0 \to 1}, t_{1 \to 2}, t_{2 \to 3}, \ldots, t_{n-1 \to n}$. Theoretically, both methods are equivalent in that a reference frame $F_0$ can be related to a target frame $F_t$ by the function $$F_0 = t_{0 \to t} F_t$$

using the cumulative approach, or $$F_0 = t_{0 \to 1} o\ t_{1 \to 2} o \ldots o\ t_{t-1 \to t} F_t$$

using the differential approach.

Nonetheless, the two methods differ for two reasons. First, in practice, the estimated coordinate transformations between pairs of images register them only approximatley due to variations outside the eight allowed parameters, movement of the center of projection, objects moving in the scene, etc.; accordingly, when a large number of estimated parameters are composed, cumulative error sets in. Second, although images theoretically extend infinitely in all directions, in practice they are cropped to a rectangular bounding box; thus, a given pair of images may not overlap at all, in which case it is not possible to estimate the parameters of a coordinate transformation using those two frames.

Accordingly, when camera movement is monotonic, any errors that accumulate along the registered sequence are not particularly noticeable, and cumulative parameter estimation is favored. On the other hand, if the camera movement is small, so that any pair of frames chosen from the video orbit have a substantial amount of overlap when expressed in a common coordinate system, differential parameter estimation is favored.

Preferably, normal (or wide-angle) and zoom images are combined by "upsampling" the normal image onto a denser lattice of pixels, widening the space between pixels (and resulting in a sparser image) but making new interstitial pixels available. When the two images are scaled to make feature sizes consistent, the zoom image will necessarily reflect a greater pixel density than the normal image; accordingly, the pixel density of the new lattice is chosen to correspond to the density of the unmodified zoom image, allowing it to be imposed directly onto the lattice. See, e.g., Irani et al., *CVGIP*, vol. 53, pp. 213–39 (May 1991). The exact manner in which pixels are imposed can take several forms.

In the simplest "most recent arrival" approach, pixels from the zoom image overwrite pixels in the upsampled lattice, regardless of whether the overwritten pixels are blank or contain information from the normal image. Preferably, however, the zoom-image pixels are statistically combined with those of the normal image. This approach is particularly useful where more than two images are being combined, in which case statistical combination is applied to pixels from all images that correspond to each image point. Suitable modes of statistical combination include obtaining the median, mean, mode or trimmed mean of the luminance and/or color values of the pixels to be combined.

c. Scene Widening

While combining the common portions of overlapping images can enhance the resolution of those portions, combining the non-overlapping portions facilitates construction of an image of greater spatial extent than any of the component images.

As noted earlier, projective transformation causes a rectangular image to assume the shape of an arbitrary quadrilateral. This creates a "keystoning" effect, choking the image where previously parallel lines converge and spreading the image where such lines diverge. It is therefore important, when combining images, to correct for the effect of keystoning on pixel resolution; choked areas are averaged or otherwise processed to accommodate the smaller number of pixels available to express the image information, while information is added to spread areas to fill otherwise blank pixels. This is preferably accomplished by combining overlapping image portions through statistical combination (with or without upsampling as described above), utilizing a sufficiently large pixel lattice to accommodate piecewise combination of all of the non-overlapping regions.

d. Recovery of Camera Parameters

Because the projective transformation encodes camera translation, pan, tilt, rotation about the optical axis and zoom, relating two frames by such a transformation implicitly involves modeling these elements of camera movement. The A parameter encodes stretching of lines and their rotation about the optical axis of the camera; the b parameter encodes simple translation along the x and y axes; and the c parameter encodes the perspective recession of the recorded scene (that is, its "chirp rate"). Accordingly, the A parameter encodes zooming, shearing and rotation about the optical axis, and the two c parameters reflect the degree of tilt and pan between two scenes.

e. Image Construction

By characterizing the orbit of a plurality of related frames, one can apply a projective coordinate transformation to the image in any particular frame to produce another, arbitrary scene that is consistent with all other frames even though never actually recorded by the camera. In other words, the camera parameters encoded by the projective transformation can be hypothetically applied to any individual scene without loss of information or interpolation. This capability facilitates, for example, construction of a smooth transition between otherwise disconnected frames.

Projectively transforming an image according to Equation 10 ensures that the transformed and reference images lie in the same orbit. Thus, for example, to obtain a "bridging" frame between first and second related frames, one can obtain the projective parameters relating the first to the second frame, and then projectively transform the first frame using smaller parameters. Alternatively, a source video frame can be processed using some other technique, and the result compared with the source frame to determine whether it lies in the same orbit—that is, whether the error associated with the projective transformation relating the source to the processed frame falls below some predetermined acceptability limit.

f. Visual Thesauri

The capacity to discriminate, by means of the error associated with the projective transformation, between projectively related and unrelated images can be used to guide a search through an image database. Images representing different views of the search image will have a low associated error value, while unrelated images will be clearly revealed by high error values. The search can be accelerated using the coarse-to-fine implementation described above; obviously, irrelevant images can be culled at the rapidly executed coarse level, speeding overall processing.

An exemplary implementation of this aspect of the invention is a database library of digitized architectural images. The search image can be a photographic image or even a sketch of salient building features; of course, the better and more detailed the search image, the fewer will be the number of false positives identified by the search.

4. Hardware Implementation

Figure 2:
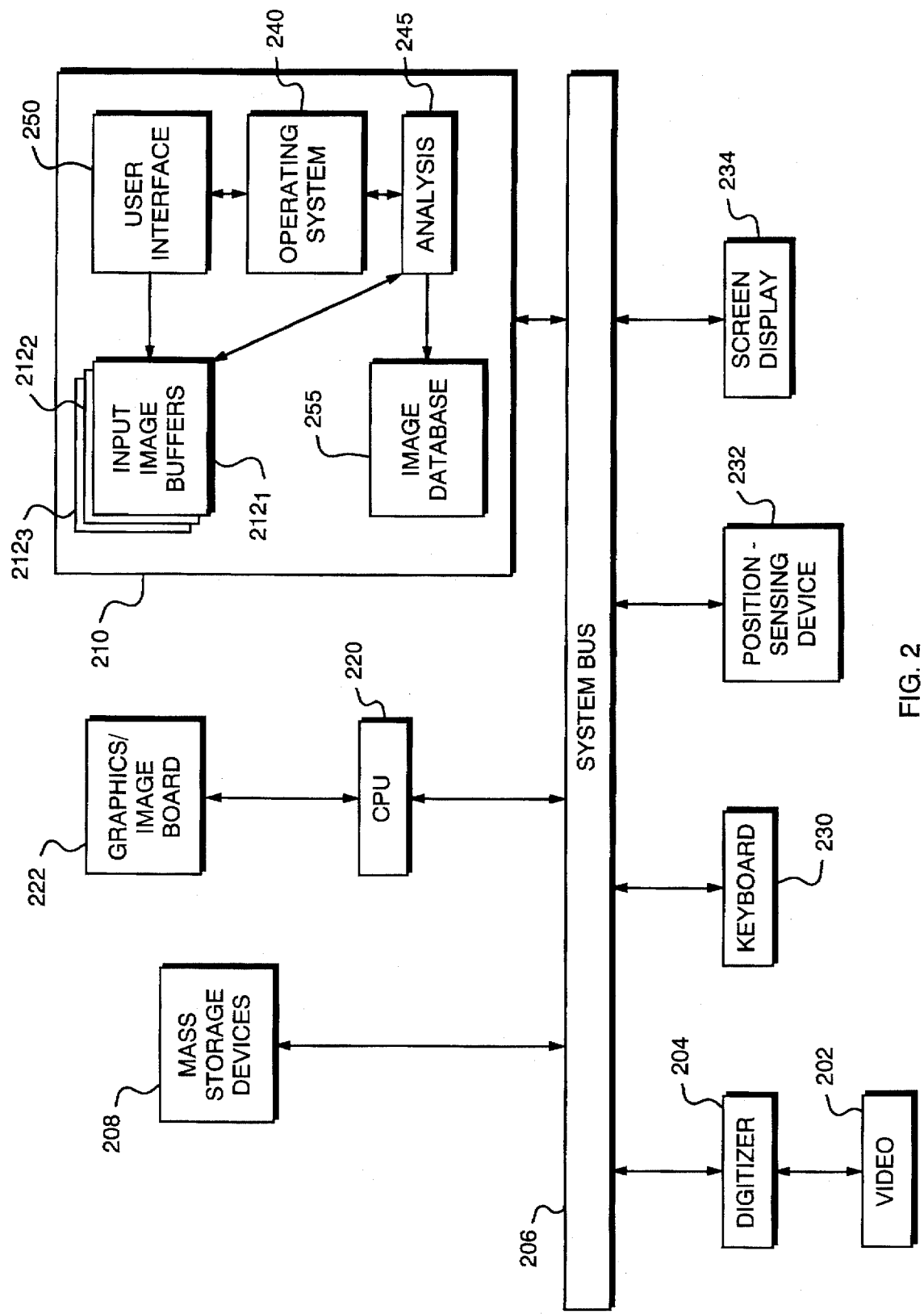
FIG. 2 schematically illustrates a representative hardware environment for the present invention.

Refer now to FIG. 2, which illustrates, in block-diagram form, a hardware system incorporating the invention. As indicated therein, the system includes a video source 202 (e.g., a video camera or playback device), which supplies input images to be analyzed. The output of video source 202 is digitized as a frame into a pixelmap by a digitizer 204. The digitized video frames are sent as bitstreams on a system bus 206, over which all system components communicate, and may be stored in a mass storage device (such as a hard disk or optical storage unit) 208 as well as in a main system memory 210 (specifically, within a partition defining a Series of input image buffers capable of storing a sequence of video frames, and representatively denoted by reference numerals $212_1, 212_2, 212_3 \ldots$).

The operation of the illustrated system is directed by a central-processing unit ("CPU") 220. To facilitate rapid execution of the image-processing operations hereinafter described, the system preferably contains a graphics or image-processing board 222; this is a standard component well-known to those skilled in the art.

The user interacts with the system using a keyboard 230 and a position-sensing device (e.g., a mouse) 232. The output of either device can be used to designate information or select particular areas of a screen display 234 to direct functions to be performed by the system.

The main memory 210 contains a group of modules that control the operation of CPU 220 and its interaction with the other hardware components. An operating system 240 directs the execution of low-level, basic system functions such as memory allocation, file management and operation of mass storage devices 208. At a higher level, an analysis module 245, implemented as a series of stored instructions, directs execution of the primary functions performed by the invention, as discussed below; and instructions defining a user interface 250 allow straightforward interaction over screen display 234. User interface 250 generates words or graphical images on display 234 to prompt action by the user, and accepts user commands from keyboard 230 and/or position-sensing device 232. Finally, to facilitate use of the invention as a visual thesaurus, memory 210 includes a partition 255 for storing a searchable image database or sequentially accessed portions thereof.

The contents of each image buffer 212 define a "raster," i.e., a regular two-dimensional pattern of discrete pixel positions that collectively represent an image and may be used to drive (e.g., by means of image-processing board 222 or an image server) screen display 234 to display that image. The contents of each memory location in a frame buffer directly govern the appearance of a corresponding pixel on display 234.

It must be understood that although the modules of main memory 210 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention is directed by analysis module 245, which governs the operation of CPU 220 and controls its interaction with main memory 210 in performing the steps necessary to establish homographic correspondences between images, and then further process those images as detailed above. Thus, in a representative implementation, a reference image is stored in buffer $212_1$ and a target image in buffer $212_2$. Analysis module 245 determines the projective transformation parameters relating the reference and target images, and identifies pixels in each of the images corresponding to common subject matter (that is, the reference-image and target-image pixels related to one another by the projective transformation, and which exhibit relatively low variation in E). Analysis module 245 then combines these pixels in a manner that enhances detail. For example, the common image portions can be stored in a separate buffer at a higher resolution, or the pixels averaged to provide greater accuracy at the same resolution. In the latter case, analysis module 245 can be further configured to combine the processed overlapping pixels with non-overlapping pixels from both images in order to produce a composite image of larger spatial extent (and pixel dimension) than either component image alone, storing the composite image in memory 210 for viewing on display 234. Analysis module 245 can also be configured to store, in memory 210, the numerical projective-transformation parameters for presentation to the user over screen display 234.

In one embodiment, analysis module 245 approximates the projective coordinate transformation parameters using the optical-flow procedure (Equation 6, followed by the four-point approximation). Alternatively, analysis module 245 comprises hardware or software means for generating an optical flow field relating the two images, and derives the parameters using the optical-fit procedure.

Through pairwise analysis of multiple images, analysis module 245 can recover the orbit relating these images as outlined above. Responding to commands entered by the user over keyboard 230 or position-sensing device 232, analysis module 245 utilizes the orbit to process any of the analyzed images into a modified image consistent with the orbit.

Finally, analysis module can be instructed to assess a reference image stored in one of the buffers 212 against a series of images in image database 210 to find images containing common subject matter.

It will therefore be seen that the foregoing represents a highly extensible and advantageous approach to relating and combining multiple related images. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of aligning a plurality of images having common subject matter, each image being encoded as an ordered set of pixels each having at least one associated pixel parameter, the method comprising:

a. featurelessly approximating parameters of a projective coordinate transformation that spatially relates, in first and second images, pixels corresponding to common subject matter therebetween;

b. applying the parameters to the first image to thereby transform it into a processed image, the common subject matter encoded by pixels in the processed image being substantially spatially consistent with the common subject matter encoded by pixels in the second image; and c. aligning the images by combining the pixels corresponding to the common subject matter.

2. The method of claim 1 wherein the parameters are approximated according to steps comprising:

a. for each of a plurality of pixels in the first image, defining a model velocity $u_m$, $v_m$ that quantifies, in each of two orthogonal directions, allowable deviations in a pixel parameter according to the projective coordinate transformation;

b. for each of the plurality of first-image pixels, defining a flow velocity $u_f$, $v_f$ that expresses, in each of two orthogonal directions, the actual deviation in the pixel parameter between the first-image pixel and a plurality of pixels in the second image; and c. locating, for each of the plurality of first-image pixels, a corresponding second image pixel such that the squared sum of differences between $u_m$, $v_m$ and $u_f$, $v_f$ for all of the plurality of first-image pixels and all corresponding second-image pixels is minimized.

3. The method of claim 1 wherein the parameters are approximated according to steps comprising:

a. generating an optical flow field comprising flow velocities relating pixels in the first image to corresponding pixels in the second image; and b. regressively approximating, from the flow field, parameters of a projective coordinate transformation consistent with the flow field.

4. The method of claim 2 wherein the squared sum of differences is given by $$\begin{bmatrix} \Sigma x^2 y^2 E_x^2, & \Sigma x^2 y E_x^2, & \Sigma xy^2 E_x^2, & \Sigma xy E_{xx}, & \Sigma x^2 y^2 E_y E_{xx}, & \Sigma x^2 y E_y E_{xx}, & \Sigma xy^2 E_y E_{xx}, & \Sigma E_y xy E_x \\ \Sigma x^2 y E_x^2, & \Sigma x^2 E_x^2, & \Sigma xy E_x^2, & \Sigma x E_x^2, & \Sigma x^2 y E_y E_{xx}, & \Sigma x^2 E_y E_{xx}, & \Sigma xy E_y E_{xx}, & \Sigma E_y x E_x \\ \Sigma xy^2 E_x^2, & \Sigma xy E_x^2, & \Sigma y^2 E_x^2, & \Sigma y E_x^2, & \Sigma xy^2 E_y E_{xx}, & \Sigma xy E_y E_{xx}, & \Sigma y^2 E_y E_{xx}, & \Sigma E_y y E_x \\ \Sigma xy E_x^2, & \Sigma x E_x^2, & \Sigma y E_x^2, & \Sigma E_x^2, & \Sigma xy E_y E_{xx}, & \Sigma x E_y E_{xx}, & \Sigma y E_y E_{xx}, & \Sigma E_y E_x \\ \Sigma x^2 y^2 E_x E_y, & \Sigma x^2 y E_x E_y, & \Sigma xy^2 E_x E_y, & \Sigma E_x xy E_y, & \Sigma x^2 y^2 E_y^2, & \Sigma x^2 y E_y^2, & \Sigma xy^2 E_y^2, & \Sigma xy E_y^2 \\ \Sigma x^2 y E_x E_y, & \Sigma x^2 E_x E_y, & \Sigma xy E_x E_y, & \Sigma E_x x E_y, & \Sigma x^2 y E_y^2, & \Sigma x^2 E_y^2, & \Sigma xy E_y^2, & \Sigma x E_y^2 \\ \Sigma xy^2 E_x E_y, & \Sigma xy E_x E_y, & \Sigma y^2 E_x E_y, & \Sigma E_x y E_y, & \Sigma xy^2 E_y^2, & \Sigma xy E_y^2, & \Sigma y^2 E_y^2, & \Sigma y E_y^2 \\ \Sigma xy E_x E_y, & \Sigma x E_x E_y, & \Sigma y E_x E_y, & \Sigma E_x E_y, & \Sigma xy E_y^2, & \Sigma x E_y^2, & \Sigma y E_y^2, & \Sigma E_y^2 \end{bmatrix} \begin{bmatrix} q_x xy \\ q_x x \\ q_x y \\ q_x \\ q_y xy \\ q_y x \\ q_y y \\ q_y \end{bmatrix} =$$

$$- [\Sigma E_t xy E_{xx}, \Sigma E_t x E_{xx}, \Sigma E_t y E_{xx}, \Sigma E_t E_{xx}, \Sigma E_t xy E_y, \Sigma E_t x E_y, \Sigma E_t y E_y, \Sigma E_t E_y]^T$$

5. The method of claim 2 wherein the plurality of pixels in the first image are the four corners of a pixel bounding box.

6. The method of claim 1 further comprising the steps of:

d. sampling each of the first and second images at a first sampling frequency to produce initial sets of pixels encoding the images at an initial resolution;

e. performing step (a) on the pixels at the initial resolution to identify subject matter common to the first and second images;

f. sampling each of the first and second images at a second sampling frequency to produce subsequent sets of pixels encoding the images at a higher resolution; and g. performing steps (a) and (b) on the pixels.

7. The method of claim 1 further comprising the steps of:

d. following transformation of the first image into the processed image, repeating at least once steps (a) and (b) on the processed image to transform the processed image into a reprocessed image; and e. deriving a new set of transformation parameters based on transformation of the first image into the processed image and transformation of the processed image into the reprocessed image.

8. The method of claim 7 further comprising repeating steps (d) and (e) on different versions of the first and second images, each version encoding a different resolution level.

9. The method of claim 1 wherein the second image is a zoomed-in version of a portion of the first image, the pixels of the first image being upsampled and combined with the pixels of the second image by a process selected from (i) last to arrive, (ii) mean, (iii) median, (iv) mode and (v) trimmed mean.

10. A method of aligning a plurality of images having common subject matter, each image being encoded as an ordered set of pixels each having at least one associated pixel parameter, the method comprising:

a. analyzing first and second images to identify pixels corresponding to common subject matter therebetween and spatially related by a first projective coordinate transformation;

b. approximating the first projective coordinate transformation;

c. projectively transforming the first image using the approximate projective coordinate transformation to produce an intermediate image;

d. analyzing the intermediate and second images to identify pixels corresponding to common subject matter therebetween and spatially related by a second projective coordinate transformation;

e. approximating the second projective coordinate transformation;

f. accumulating the approximate projective coordinate transformations into a composite transformation relating the first image to the second image;

g. applying the composite transformation to the first image to thereby transform it into a processed image, the common subject matter encoded by pixels in the processed image being substantially spatially consistent with the common subject matter encoded by pixels in the second image; and h. aligning the images by combining the pixels corresponding to the common subject matter.

11. Apparatus for aligning first and second images having common subject matter comprising:

a. first and second computer memories for storing each image as an ordered set of pixels each having at least one associated pixel parameter;

b. analysis means for featurelessly approximating parameters of a projective coordinate transformation that spatially relates pixels corresponding to common subject matter of the first and second images; and c. image-processing means for (i) applying the parameters to the contents of the first computer memory to thereby transform them into a processed image, the common subject matter encoded by pixels in the processed image being substantially spatially consistent with the common subject matter encoded by pixels in the second computer memory, and (ii) aligning the images by combining the pixels corresponding to the common subject matter.

12. The apparatus of claim 11 wherein the analysis module is configured to approximate the parameters by:

a. for each of a plurality of pixels in the first computer memory, defining a model velocity $u_m$, $v_m$ that quantifies, in each of two orthogonal directions, allowable deviations in a pixel parameter according to the projective coordinate transformation;

b. for each of the plurality of pixels in the first computer memory, defining a flow velocity $u_f$, $v_f$ that expresses, in each of two orthogonal directions, the actual deviation in the pixel parameter between the pixel in the first computer memory and a plurality of pixels in the second computer memory; and c. locating, for each of the plurality of pixels in the first computer memory, a corresponding pixel in the second computer memory such that the squared sum of differences between $u_m$, $v_m$ and $u_f$, $v_f$ for all of the plurality of pixels in the first computer memory and all corresponding pixels in the second computer memory is minimized.

13. The apparatus of claim 11 wherein the analysis module is configured to approximate the parameters by:

a. generating an optical flow field comprising flow velocities relating pixels in the first computer memory to corresponding pixels in the second computer memory; and b. regressively approximating, from the flow field, parameters of a projective coordinate transformation consistent with the flow field.

14. A visual thesaurus comprising:

a. a database of images each stored as an ordered set of pixels, each pixel having at least one associated pixel parameter;

b. first and second computer memories for storing a reference image and a database image;

c. analysis means for sequentially retrieving images from the database and storing each retrieved image in the second computer memory, the analysis means operating, for each retrieved image, on the first and second computer memories to detect the existence of common subject matter between the reference image and the database image by featurelessly determining whether pixels from the first computer memory can be related to pixels of the second computer memory according to a projective coordinate transformation, and if not, rejecting the database image as unrelated to the reference image; and d. an interface for displaying database images related to the reference image.

* * * * *